P. Frost.

Scythe-Fastening.

No 2834 Reissued Jan. 14, 1868.

United States Patent Office.

PINCKNEY FROST, OF SPRINGFIELD, VERMONT.

*Letters Patent No.* 9,531 *dated January* 11, 1853; *reissue No.* 524, *dated February* 9, 1858; *extended seven years; reissue No.* 2,834, *dated January* 14, 1868.

IMPROVEMENT IN SCYTHE-FASTENINGS.

The Schedule referred to in these Letters Patent and making part of the same.

TO ALL WHOM IT MAY CONCERN:

Be it known that I, PINCKNEY FROST, of Springfield, in the county of Windsor, and State of Vermont, have invented a new and improved Mode of Fastening Scythes to the Snath; and I do hereby declare that the following is a full, clear, and exact description thereof.

The accompanying drawings represent views of my improved scythe-fastener. The same letters refer to like parts.

Figure 1:
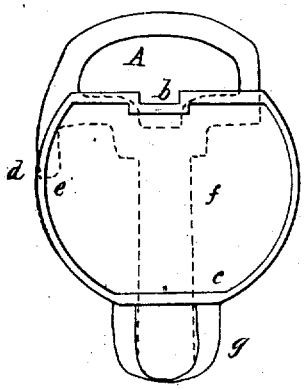
Figure 1 represents the loop-bolt, as used in connection with the set-ring.
Figure 2:
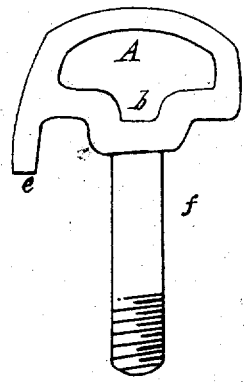
Figure 2 is a side view of the loop-bolt, the thickness of which can be seen in the openings in figs. 4 and 7, at C.
Figure 3:
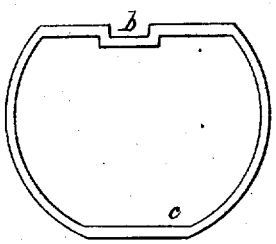
Figure 3 is an end view of the set-ring.
Figure 4:
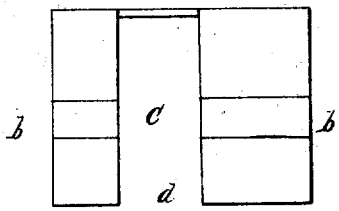
Figure 4 is a view of the set-ring, as seen on the spotting.
Figure 8:
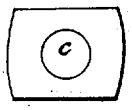
Figure 8 is a view of the set-ring, on the side opposite the spotting.
Figure 7:
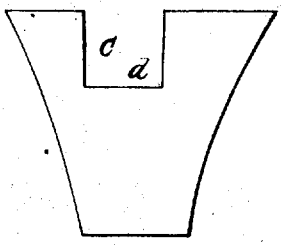
Figure 7 is a view of one side of the set-ring.
Figure 9:
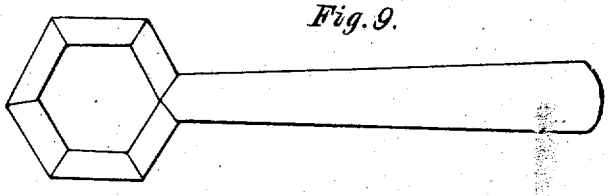

A, in the figs. 1 and 2, is an opening for the admission of the shank or arm of the scythe. *b* represents, in figs. 1, 2, and 3, the grooves in the loop-bolt, and *b'* are similar grooves in the set-ring, for the passage of the claw of the scythe. C, in figs. 4 and 7, represents the opening in the set-ring for the admission of the hook or lip *e*, which, bearing against the side of the snath, prevents the strain from coming upon the ring when in use, so as to loosen or break it. *f* represents the bolt, which passes vertically through the snath and set-ring at *c*. *g* represents the nut on the end of the bolt *f*, turned by the wrench represented in Figure 9, by means of which the loop is drawn down upon the shank or arm of the scythe, fastening it firmly to the spotting.

Figure 5:
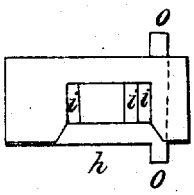

Figure 5 is a view of the face of the socket.

Figure 6:
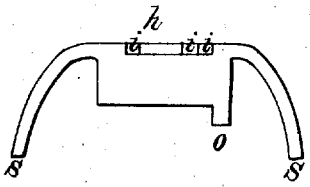

Figure 6 is a side view of the socket.

*h* represents the depression on the side of the claw-hole, in which the extremity of the shank or arm of the scythe rests. *i* represent the slides, which are used for the purpose of varying the point of the scythe, by setting it outward or inward with respect to the snath. O O O represent projections on the sides of the sockets, for the purpose of gaining the greater strength of wood in attaching it to the snath. S represents straps which pass partially around the snath, and are confined by screws or a rivet, to the wood. The peculiar construction of the loop-bolt and set-ring, as above described, constituting my improved scythe-fastener, adapts it to different sizes of scythe-shanks, and the advantages gained by the use of the grooves in the loop-bolt and set-ring are, first, to permit the arm and claw of the scythe to pass through the loop, without requiring the latter to be made so large as to be inconvenient and unnecessarily heavy; second, the groove in the set-ring saves time and labor in turning the nut *g*, to fasten and unfasten the scythe, and also serves to keep the ring firmly in its place on the snath; third, this form of the construction of the loop-bolt and set-ring lessens the labor in fastening the scythe to and unfastening it from the snath, it being unnecessary to turn the nut as far as otherwise would be required; fourth, the draught of the screw being directly towards the spotting of the snath, the scythe will be more firmly held than if it were sideways or lengthways.

The important and essential principle of my invention is the use of the loop-bolt and the set-ring, constructed substantially in the manner above set forth, in combination with each other. The bolt being operated by the screw and nut, or their equivalents, draws the shank of the scythe down to and confines it firmly upon the snath. The ring gives the necessary strength to the snath, and receives and assists in confining the bolt. And thus used and operating together, the bolt and the ring constitute a new, complete, and efficient scythe-fastener.

Having thus described my invention, what I claim as new, and desire to secure by Letters Patent, is—

The loop-bolt, provided with the groove *b* and the hook or loop *e*, in combination with the set-ring, also provided with a groove, *b'*, all constructed and arranged substantially as and for the purpose set forth.

Witnesses:

HERMAN W. HARLOW,
GERSHOM L. CLOSSON.

PINCKNEY FROST.